United States Patent [19]

Wolverton

[11] 4,415,450

[45] Nov. 15, 1983

[54] METHOD FOR TREATING WASTEWATER USING MICROORGANISMS AND VASCULAR AQUATIC PLANTS

[75] Inventor: Billy C. Wolverton, Picayune, Miss.

[73] Assignee: The United States of America as represented by the Administrator of the National Aeronautics and Space Administration, Washington, D.C.

[21] Appl. No.: 335,036

[22] Filed: Dec. 28, 1981

[51] Int. Cl.³ .............................. C02F 3/30; C02F 3/32
[52] U.S. Cl. .................................... 210/602; 210/605; 210/617; 210/151; 47/58
[58] Field of Search ............... 210/602, 603, 610, 611, 210/605, 630, 617, 150, 151, 218; 48/197 A; 47/58

[56] References Cited

U.S. PATENT DOCUMENTS

| | | | |
|---|---|---|---|
| 681,884 | 9/1901 | Monjeau | 210/602 |
| 3,770,623 | 11/1973 | Seidel | 210/602 |
| 3,894,355 | 7/1975 | Carothers | 210/602 |
| 4,333,837 | 6/1982 | Plosz et al. | 210/602 |

FOREIGN PATENT DOCUMENTS 2150480 4/1973 Fed. Rep. of Germany ...... 210/602

OTHER PUBLICATIONS

*NASA Tech. Briefs;* "Treating Domestic Wastewater With Water Hyacinths" (Fall 1980).
*Chem. Eng.;* "Big Waste-Treatment Job for Water Hyacinths" pp. 34–37; (May 1981).
Wolverton et al.; "Upgrading Facultative Wastewater Lagoons With Vascular Aquatic Plants"; *Jour. W.P.C.F.* vol. 51, No. 2; pp. 305–307, (Feb. 1979).

*Primary Examiner*—Benoît Castel
*Attorney, Agent, or Firm*—Joseph H. Beumer; John R. Manning; Leon D. Wofford, Jr.

[57] ABSTRACT

A method for treating wastewater comprising the steps of subjecting the wastewater to an anaerobic settling step for at least 6 hours and passing the liquid effluent from the anaerobic settling step through a filter cell in an upflow manner, wherein the effluent is subjected first to the action of anaerobic and facultative microorganisms and then to the action of aerobic microorganisms and the roots of at least one vascular aquatic plant.

17 Claims, 3 Drawing Figures

METHOD FOR TREATING WASTEWATER USING MICROORGANISMS AND VASCULAR AQUATIC PLANTS

ORIGIN OF THE INVENTION

The invention described herein was made by an employee of the U.S. Government and may be manufactured or used by or for the Government for governmental purposes without payment of any royalties thereon or therefor.

TECHNICAL FIELD

This invention relates to a process for the purification of wastewater for recycling or discharge to groundwater sources.

BACKGROUND ART

Recent wastewater regulations promulgated by the U.S. Environmental Protection Agency (EPA) require secondary treatment as the minimum acceptable level of treatment prior to discharge of surface waters. Increases in industrial wastes discharged into domestic sewage treating plants has also increased significantly the need for improved wastewater treatment methods to remove hazardous chemicals and to meet the secondary treatment standards.

In many parts of the country, the available supply of fresh groundwater has become contaminated with toxic chemicals or the groundwater table has been drastically lowered by effects of inadequate rainfall. In these areas, advanced wastewater treatment and reuse of wastewater will become a necessity in the foreseeable future.

Seidel has proposed, in U.S. Pat. No. 3,770,623 herein incorporated by reference, a system for purifying waters polluted with oily pollutants, coarse suspended materials, slime, colloidal material, dissolved inorganic compounds and/or pathogenic organisms by a three-stage process, in the first stage of which gravitational separation of floatable oily pollutants and heavy sediment is accomplished, in the second stage of which the remaining aqueous material is treated in filtration beds containing plants having nodes to remove slime and colloidal material by filtration and in the third stage of which the effluent from the second stage is passed into a bed containing plants which can use the dissolved impurities as nutrients. For waters heavily contaminated with pathogens, plants with bacterial nodules will be used in the second or third stages.

Serfling et al. have proposed, in U.S. Pat. No. 4,169,050, to treat wastewaters using pollution-consuming, floating aquatic plants which have high surface area, submerged, activated bio-web substrates of high fixed bacterial film area and activity.

Carothers has proposed (U.S. Pat. No. 3,728,254) a process for recycling waste products, which utilizes conventional activated sludge aeration tanks and a "trickling filter effect" to enhance aeration and bacterial growth in the aeration tank.

Wolverton, "New Hybrid Wastewater Treatment Systems Using Anaerobic Microorganisms and Reeds," presented at a Seminar on Innovative Wastewater Treatment Technology, Louisville, Ky. (Apr. 23, 1981), incorporated herein by reference, has reviewed the art with respect to the separate uses of anaerobic microorganisms and vascular aquatic plants for the treatment of wastewaters and has proposed an improved treatment system combining the foregoing to treat wastewaters after a preparatory anaerobic settling step.

It will be apparent that higher standards required for recycle or discharge of wastewaters require the development of improved wastewater treatment technology. Present economic conditions in the United States make highly desirable the development of technology which consumes less energy and is more cost effective and more efficient than wastewater treatment methods presently available.

It is the object of this invention to provide a simple and effective method for purifying wastewaters, which method is low in energy requirements and economical in operation.

DISCLOSURE OF THE INVENTION

This invention relates to a method for purification of wastewater comprising the steps of subjecting the wastewater to an anaerobic settling step for at least 6 hours and passing the liquid effluent from the anaerobic settling step through a filter cell in an upflow manner, wherein the effluent is subjected first to the action of anaerobic and facultative microorganisms and then to aerobic microorganisms and the roots of at least one vascular aquatic plant.

In another aspect, this invention relates to a system for treating wastewater, comprising a preliminary vessel in which is carried anaerobic settling and a hybrid filter for the effluent from the preliminary vessel, the hybrid filter having a lower portion inoculated on the surface thereof with anaerobic and facultative microorganisms and having an upper portion the surface of which is inoculated with aerobic microorganisms and in which is growing vascular aquatic plants, wherein means for transferring effluent from the preliminary vessel feed the effluent upwardly through the lower portion of the hybrid filter toward the upper part of the hybrid filter.

Preliminary treatment of wastewaters (shown as 1 in FIG. 1) in accordance with the present invention can be carried out in any sludge collecting and digesting chamber, for example, a simple septic tank, a covered anaerobic lagoon, a primary settling/digestion tank, or an Imhoff tank arrangement, shown as 2 in FIG. 1. The sludge collecting chamber will normally be provided with means for venting carbon dioxide, methane and other gaseous products from the system and may be provided with means for the removal of collected sludge. In the practice of this invention, a minimum of 6 hours treatment in the sludge collecting chamber will normally be required. However, longer residence times, preferably greater than 12 hours, are preferred. Although there is no theoretical upper limit on the residence time in the sludge collecting chamber, practical considerations, including limitations on the size and number of chambers needed to process a given volume of sewage or other wastewater, will normally favor selecting the shortest residence time permitting settling of 30–50% of the total suspended solids (TSS) and removal of about the same amount of 5-day biochemical oxygen demand ($BOD_5$).

In the second step of the process, supernatant liquid from the sludge collecting chamber (anaerobic settling tank, designated 2' of FIG. 1) is treated in a hybrid filter system (3' in FIG. 1) consisting of a filter base to which is fixed a film of anaerobic, facultative and aerobic microorganisms and in which is growing one or more vascular aquatic plants. The filter bed can be constructed from rocks of varying sizes or from vinyl core media. In either case, the top layer of the filter bed is preferably pea gravel (0.25–1.5 cm particles shown as 11 in FIG. 2) to serve as a support for the vascular aquatic plants, a sealer, and a final aerobic microbial surface area for final polishing and oxidation of odorous volatile sulfides to non-volatile sulfates.

When rocks are used to construct the filter bed, an intermediate layer of rocks (2.5–7.5 cm, 12 in FIG. 2) and a base layer of 7.5–15 cm rocks (shown as 13 in FIG. 2) is preferably employed. Vinyl core media are available commercially. These materials have been used in trickling filter type systems and can contain up to 214 square meters of surface area per cubic meter of media. This is approximately four times that of a rock filter, because rocks create 40%–50% voids while vinyl core media create a 96% or less voids. Vinyl cores are lightweight and easier to transport and install than rocks, but vinyl cores cost more per system than rock. It will be understood that the choice of core material will be based on cost considerations and the relative convenience of the two types of filter bed constructions.

The anaerobic filter concept for treating domestic wastewater was disclosed by Young, et al., "The Anaerobic Filter for Waste Treatment," *Jour. Water Pollution Control Fed.*, 41:160 (1969). Further utilization of these systems include cases disclosed by Koon, et al., "The Feasibility of an Anaerobic Upflow Fixed-Film Process for Treating Small Sewage Flows." Conference on Energy Optimization of Water and Wastewater Management for Municipal and Industrial Applications, New Orleans, La. (December, 1979); Switzenbaum, "Anaerobic Attached Film Expanded Bed Reacter Treatment of Dilute Organics," 51st Annual Water Pollution Control Federation Conference, Anaheim, Ca. (1978) and Wolverton, et al., "Energy From Vascular Plant Wastewater Treatment Systems." *Econ. Botany* 35(2):224–232 (1981). The foregoing are incorporated herein by reference.

The anaerobic filter provides a high surface area for the attachment and growth of bacterial and fungi with growth patterns considered slow relative to those of aerobic microorganisms associated with waste treatment. Because of the filter, large $\theta_c$'s (mean cell residence times) of approximately 100 days can be achieved with short hydraulic retention times. In the bottom and middle zones of the filter, a two-step decomposition of the organic matter takes place.

The first step occurs (21 in FIG. 2) mostly with facultative or obligate anaerobic bacteria, which hydrolyze and convert complex organic compounds into simple organic acids such as acetic or propionic acid. Examples of microorganisms which normally accomplish this first step are Clostridium spp., *Peptococcus anaerobus*, Bifidobacterium spp., Desulphoribrio spp., Corynebacterium spp., Lactobacillus, Actinomyces, Staphylococcus, and *Escherichia coli*.

The second step (22 in FIG. 2) involves the conversion of the simple organic acids into methane, carbon dioxide, and trace amounts of hydrogen and hydrogen sulfide. The bacteria which accomplish this final conversion are strict anaerobes, the majority of which belong to the following genera: Methanobacterium, Methanobacillus, Methanococcus, and Methanosarcina.

In the top zone (23 in FIG. 2) aerobic microorganisms, which aid in the oxidation of odorous sulfides to sulfates and facultative bacteria performing aerobic processes exist. Facultative bacteria normally associated with aerobic waste treatment are Achromobacter, Flavobacterium, Pseudomonas, and Alcaligenes. Fungi common to trickling filter processes also evolve near the surface. Common fungi associated with this process are Fusazium, Mucor, Penicillium, Geotrichum, and Sporotichum. These lists of microorganisms common to anaerobic filters and the top aerobic zone were comprised of those discussed in: Metcalf & Eddy, Inc. 1979. *Wastewater Engineering: Treatment/Disposal/Reuse.* 2nd Ed. New York, N.Y. Chapter 9, herein incorporated by reference.

The use of water hyacinth (*Eichhornia crassipes*) in wastewater treatment has been investigated extensively both in the laboratory and in field trials. This plant has been successfully used in wastewater treatment in the south and southwestern United States. See, for example, Boyd, "Vascular Plants for Mineral Nutrient Removal from Polluted Waters," *Econ. Bot.*, 24:95–103 (1970); Dinges, "Upgrading Stabilization Pond Effluent by Water Hyacinth Culture," *J. Water Pollut. Control Fed.*, 50:833–845 (1978); Wolverton, "Engineering Design Data for Small Vascular Aquatic Plant Wastewater Treatment Systems," Proceedings from Aquaculture Systems for Wastewater Treatment Seminar, Univ. of California at Davis (Sept., 1979); and Wolverton, "Upgrading Facultative Wastewater Lagoons with Vascular Aquatic Plants." *J. Water Pollution Control Fed.*, 51:305—313 (1979).

Vascular aquatic plants which can be used in the beds, shown as 3' in FIG. 1 and as 24 in FIG. 2, in the second stage include, but are not limited to, reeds (*Phragmites communis*), cattails (*Typha latifolia*), bamboo (*Bambusa multiplex*) and rush (*Juncus effusus*).

The common reed (*Phragmites communis*) is a tall aquatic plant which can grow up to 4 m in height and has an extensive rhizome system. The leaf blades are deciduous and flat, 1–5 cm wide and 2–6 cm long, tapering to long slender points. Both horizontal and vertical rhizomes develop. The vertical rhizoma develop buds which form aerial shoots. The plant spreads by means of horizontal rhizomes.

The reeds grow in a wide range of water quality conditions, being found in peat bogs (pH 2.8 to 6.0) and in saline lakes (pH 8.0 to 8.5). Reeds are salt-resistant plant, preferring salinities below 10 ppt (parts per thousand) but growing in habitats with fluctuating salinities occasionally reaching 40 ppt.

Although essentially a temperate plant of both hemispheres, the reed is found from the tropics to the Arctic Circle. Aerial shoots develop only in warm weather, buth the extensive underground system of rhizomes continues to grow horizontally during cold periods, so as to allow the wastewater treatment process to continue during cold weather.

The ability of the common reed to purify wastewater has been established, as is reported by DeJong, "The Purification of Wastewater with the Aid of Rush or Reed Ponds." In: *Biological Control of Water Pollution*, J. Tourbier and R. W. Pierson, Jr., (eds.), Univ. of Pennsylvania Press, Philadelphia, 133–139 (1976) and Seidel, "Macrophytes and Water Purification," ibid, at 109–121.

Reeds can absorb nitrogen, phosphorus, other nutrients and heavy metals directly from the water by means of finely divided roots, which develop at nodes submersed below the water level. The nitrogen removal potential of reeds is 330–800 kg/ha (Kilograms per hectare) for above ground mass and 350–830 kg/ha for below ground plant mass. The ability of reeds to develop aquatic roots and absorb nutrients and other elements directly from water is advantageous and is an important reason why this plant is preferred for wastewater treatment.

The phosphorus removal potential of reeds is 10–80 kg/ha for above-ground plant mass and 38–74 kg/ha for below-ground plant mass. Reeds are salt-resistant plants, seldom taking up sodium. The sodium removal potential of the common reed is 4.6–49.3 kg/ha.

Reeds have an inherently high transpiration rate, but a low unit mass of leaves moderates the overall transpiration rate of reed beds. In Poland the transpiration of *Pragmites communis* has been measured as 30–100 cm/yr.

Biomass production reported for reeds in the U.S. range from 6,540 to 39,990 kg/ha. Combined above ground and below ground production in hydroponic culture ranges from 8,230 to 74,010 kg/ha/yr in 1- to 3-year old cultures.

Rush appear about or nearly as effective as reeds in the context of this invention.

A prototype small hybrid wastewater treatment system consisting of a settling tank in series with an anaerobic filter-reed (*Phragmites communis*) treatment cell (1', 2', 3' in FIG. 1) was evaluated and compared with a similar plant-free system (1, 2, 3 in FIG. 1). Combination of anaerobic filters (attached film filters) and vascular aquatic plants downstream of the settling tank appeared to increase the treatment efficiency of each component of the system. The plant-free system reduced the $BOD_5$ from 93 to 35 mg/l in 6 hours, compared to a reduction of 103 to 9 mg/l in the anaerobic filter-reed system in the same length of time. The $BOD_5$ and TSS after 24 hours in each component of the plant-free systems were reduced from 93 to 17 mg/l and 47 to 17 mg/l, respectively. Under the same conditions, the hybrid system reduced the $BOD_5$ from 103 to 4 mg/l and the TSS from 82 to 3 mg/l.

In the hybrid system, the contaminants of most concern in wastewater treatment were reduced after 24 hours in each component as follows: ammonia nitrogen ($NH_3$—N) from 10.8 to 0.8 mg/l, total Kjeldahl nitrogen (TKN) from 16.4 to 3.4 mg/l, and total phosphorus (TP) from 4.7 to 2.1 mg/l.

Use of an anaerobic settling tank alone reduced the TSS during two different sets of experiments from 144 to 34 mg/l and 85 to 26 mg/l following 6 hours' settling time.

It will be appreciated that the EPA standard for each of $BOD_5$ and TSS following secondary treatment is 30 mg/l. Use of the method set forth herein provides a feasible, simple, economically competitive way of meeting, if not exceeding, these standards.

The hybrid reed-rock filter system uses a combination of anaerobic, facultative and aerobic microorganisms, along with the roots of vascular aquatic plants, to treat wastewater and remove minerals. In the lower anaerobic portion of the filter, complex organic contaminants are converted to carbon dioxide, methane, and simple organics. Odorous volatile sulfides are removed by the plant roots or oxidized and/or assimilated by the aerobic microorganisms near the surface of the filter component. The combination of microorganisms and vascular aquatic plants permits the removal of phosphorus, ammonia and potassium impurities, not normally removed by treatment with microorganisms alone.

This system disclosed herein will be cost effective in both installation and operation and more versatile than presently available systems. The system disclosed can be installed in modules. Expansion can be accomplished by adding more modules. Advanced wastewater treatment can be provided by including additional modules in the system.

The process and system disclosed herein does not, once installed, require highly trained personnel for operation. The system can be installed without having any moving parts. Once wastewater enters the system, gravity flow can complete the process.

DESCRIPTION OF MOST PREFERRED EMBODIMENT

In a most preferred case, the anaerobic, facultative and aerobic organisms on the filter bed are established to a high mean cell residence time, $\theta_c$, of approximately 100 days and the vascular aquatic plant is reed or rush.

Without further elaboration, it is believed that one skilled in the art can, using the preceding description, utilize the present invention to its fullest extent. The following preferred specific embodiments are, therefore, to be constructed as merely illustrative and not limitative of the remainder of the disclosure in any way whatsoever. In the following Examples, the temperatures are set forth uncorrected in degrees Celsius. Unless otherwise indicated, all parts and percentages are by weight.

EXAMPLE 1

The anaerobic settling step was done in plastic-covered containers (113 liter capacity), into which raw sewage was pumped and allowed to settle under anaerobic conditions for 6 or 24 hours.

The supernatant liquid from the settling tanks was pumped into the bottom of a metal trough 50.5 cm wide, 30.5 cm deep and 298 cm long, which was filled to a height of 16 cm with 2.5–7.5 cm diameter railroad rocks, over which there was a layer (5 cm deep) of 0.25–1.3 cm diameter pea gravel. Some troughs contained reeds (*Phragmites communis*), grown on the surface of the rock filters. The wastewater retention time, also under anaerobic conditions, in these troughs was 6 or 24 hours. The rock filter was "matured" by several weeks of biweekly additions of anaerobic supernatant from anaerobic settling tanks to the filters. This process of maturation allowed a balanced community of anaerobic, aerobic, and facultative microorganisms of the species described above to become established at high concentrations on the rock surfaces. Therefore, high mean cell residence times, $\theta_c$, of approximately 100 days could be maintained with short hydraulic retention times of 24 hours or less.

Figure 1:
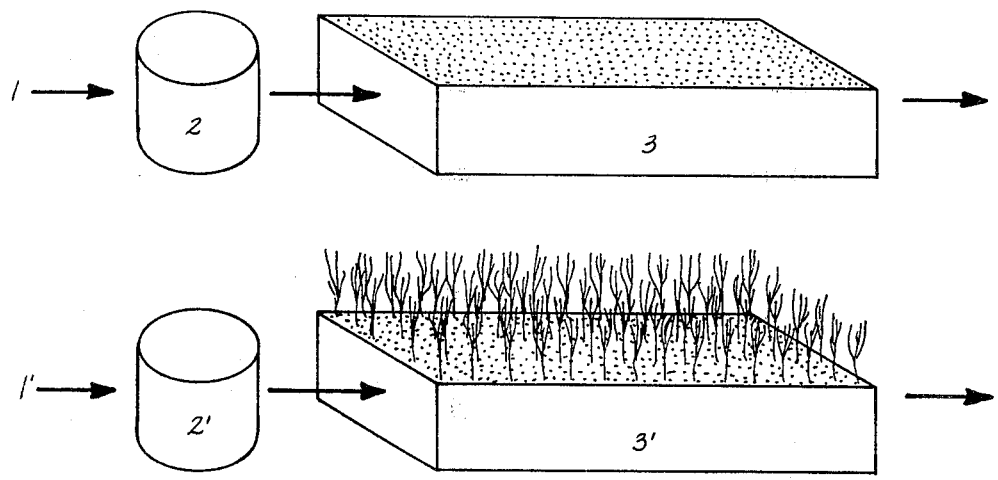
In FIG. 1 is shown a schematic comparison of the process of this invention with a process using no treatment with plants.

The experimental set up, with or without treatment by reeds in the second stage, is as shown in FIG. 1.

Raw sewage from NSTL (National Space Technology Laboratories, NSTL Station, Miss. 39539) was used as the source of sewage for all experiments. The sewage was analyzed for 5-day biochemical oxygen demand ($BOD_5$), total suspended solids (TSS), total Kjeldahl nitrogen (TKN), total phosphorus (TP) and ammonia nitrogen ($NH_3$—N) before and after treatment.

The initial and final volumes of wastewater were measured to determine water loss from the rock troughs by evaporation and from the rock-reed troughs by evapotransportation. Minimum and maximum daily greenhouse temperatures averaged 19° C. and 35° C., respectively.

Data given in the table below represent an average of at least 6 or more separate samples.

In one series of experiments (Series A), $BOD_5$ was reduced from about 95 mg/l to 82 mg/l by 24 hr in the anaerobic settling tank. Further reduction to 35 and 13 mg/l was accomplished by treatment for 6 and 24 hr, respectively, in a plant-free rock filter.

As shown by the results of Series D, use of the reed-containing rock filters in series with anaerobic settling for 24 hr, gave reduction of $BOD_5$ to 9 and 4 mg/l after 6 and 24 hr, respectively in the filter. The effluents obtained have contaminant levels significantly below those of effluents obtained using plant-free filters.

The experiments in Series E show that concentrations of Kjeldahl nitrogen, ammonia nitrogen and phosphorus were reduced insignificantly, if at all, by a combination of anaerobic settling and treatment for 24 hr in a plant-free rock filter. However, marked reduction of the concentrations of these impurities was demonstrated (Series F) by a combination of 24-hours' anaerobic settling and 24 hours' residence in a rock-filter planted with reeds.

matured in a manner similar to that described in Example 1.

The effluent from the settling tank is fed into the plant-rock filter at the bottom and flows upward through the coarse rocks and finally through the pea gravel and exits at a port just below the surface.

EXAMPLE 3

Vinyl core media, obtained commercially, are used instead of the rock bed in the plant filter treating stage. A layer of pea gravel on top of the core supports the reeds during experiments otherwise as in Example 1. Results similar to those of Example 1 are obtained.

EXAMPLE 4

Experiments were run as in Example 1, with a 24-hour holding period in the anaerobic digestion vessel and treatment for 24 hours in a hybrid filter containing reed (*Phragmites communis*), cattail (*Typha latfolia*) or rush (*Juncus effusus*). The results reported in the table below represent an average of six different experiments.

These results show that any of reed, cattail or rush can be used in the hybrid filter beds of this invention.

|  | Influent to Anaerobic Digester mg/l | | | Influent to Hybrid Filter mg/l | | | | Effluent from Hybrid Filter mg/l | | | | |
|---|---|---|---|---|---|---|---|---|---|---|---|---|
| | TSS | $BOD_5$ | $NH_3$—N | TSS | $BOD_5$ | $NH_3$—N | TKN | TSS | $BOD_5$ | $NH_3$—N | TKN | |
| | 71 | 130 | 13.6 | 24 | 78 | 11.0 | 12.0 | 14.5 | 3.0 | 0.4 | 3.0 | Reed |
| | 41 | 102 | 10.4 | 21 | 65 | 9.0 | 12.4 | 7.0 | 3.5 | 0.9 | 3.8 | Cattail |
| | 61 | 127 | 8.0 | 18.5 | 76 | 10.0 | 18.0 | 7.0 | 6.0 | 0.5 | 4.0 | Rush |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

| | Concentration mg/l Series | | | | | | | | | | | | | | |
|---|---|---|---|---|---|---|---|---|---|---|---|---|---|---|---|
| | A | | B | | C | | D | | E | | | F | | |
| | $BOD_5$ | TSS | $BOD_5$ | TSS | $BOD_5$ | TSS | $BOD_5$ | TSS | TKN | $NH_3$—N | TP | TKN | $NH_3$—N | TP |
| Raw sewage | 95 | 45 | 144 | 165 | 268 | 85 | 103 | 82 | 13.2 | 12.8 | 5.2 | 16.4 | 10.8 | 4.7 |
| Anaerobic settling | | | | | | | | | | | | | | |
| 6 hr | | | 135* | 38* | 55* | 28* | | | | | | | | |
| 24 hr | 82* | 31* | | | | | 270* | 45* | | | | | | |
| Anaerobic settling-24 hr Plant-free rock filter | | | | | | | | | | | | | | |
| 6 hr | 35* | | | | | | | | | | | | | |
| 24 hr | 13 | 17 | | | | | | | 16 | 12 | 5 | | | |
| Anaerobic settling-24 hr Rock filter with reeds | | | | | | | | | | | | | | |
| 6 hr | | | | | | | 9 | | | | | | | |
| 24 hr | | | | | | | 4 | 13 | | | | 3.5 | 0.8 | 2.1 |

*Exceeds EPA maximum discharge standard for secondary treatment.

EXAMPLE 2

Figure 2:
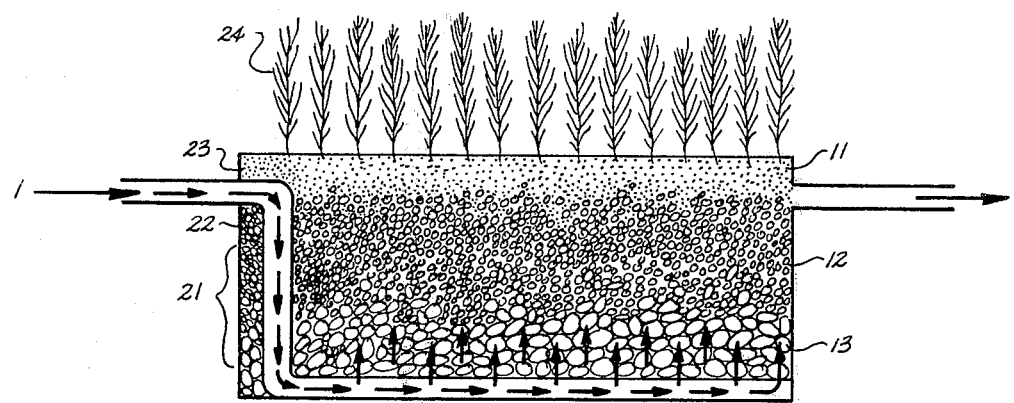
In FIG. 2 is shown a preferred configuration for the anaerobic filter reed cell used in the process of this invention.
Figure 3:
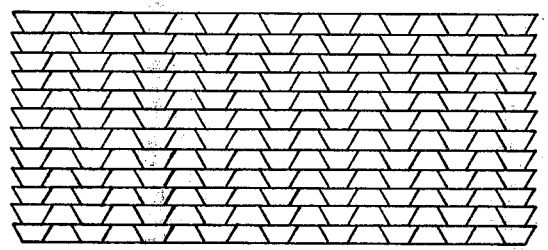
In FIG. 3 is shown a top view of a plastic anaerobic filter which can be used.

Water treatment is carried out as in Example 1, except that the plant-rock filter, as shown in FIG. 2, is structured to use a combination of anaerobic, facultative, and aerobic microorganisms in the plant-rock filter

I claim:
1. A method for treating wastewater comprising the steps of subjecting the wastewater to an anaerobic settling step for at least 6 hours and passing the liquid effluent from the anaerobic settling step upwards through a filter bed, wherein the effluent is subjected first to the action of anaerobic and facultative microor- ganisms disposed on a particulate media in a lower portion of said bed and then to the action of aerobic microorganisms disposed on a particulate media in an upper portion of said bed and the roots of at least one vascular aquatic plant.

2. The method of claim 1, wherein the vascular aquatic plant is a reed.

3. The method of claim 1, wherein the vascular aquatic plant is a rush.

4. The method of claim 1, wherein the filter bed comprises rocks and has a top layer of pea gravel, a middle layer of rocks 2.5-7.5 cm in size and a base layer of rocks 7.5-15 cm in size.

5. The method of claim 1, wherein the filter bed comprises vinyl core medium as support and has as a top layer pea gravel.

6. The method of claim 1, wherein aerobic, anaerobic, and facultative microorganisms are provided with a high surface for attachment and growth under conditions producing mean cell residence times, $\theta_c$, of approximately 100 days.

7. The method of claim 1, wherein the aerobic, anaerobic and facultative microorganisms are on the surface of the filter bed to a level of microorganisms with a mean cell residence time of approximately 100 days, the aerobic microorganisms are Achromobacter, Flavobacterium, Pseudomonas, Alcaligenes, Fusazium, Mucor, Penicillium, Geotrichum, or Sporotichum; the anaerobic microorganisms are Methanobacterium, Methanobacillus, Methanococcus, or Methanosarcina; and the facultative microorganisms are Clostridium spp., *Peptococcus anaerobus,* Bifidobacterium spp., Desulphovibrio spp., Cornebacterium spp., Lactobacillus, Actinomyces, Staphylococcus or *Escherichia coli.*

8. The method of claim 7, wherein the vascular aquatic plant is a reed.

9. The method of claim 7, wherein the vascular aquatic plant is a rush.

10. The method of claim 1, wherein the anaerobic settling step is at least 12 hours.

11. The method of claim 1, wherein sludge accummulated during the anaerobic settling step is collected and removed periodically.

12. A system for the treatment of wastewater, comprising a preliminary vessel in which is carried out anaerobic settling, inlet means entering said vessel, a hybrid filter having a bed of particulate material, a lower portion of said bed being inoculated with anaerobic and facultative microorganisms and an upper portion thereof being inoculated with aerobic microorganisms and having vascular aquatic plants growing therein, fluid communication means between the preliminary vessel and said hybrid filter for conveying the effluent from the preliminary vessel to a bottom level of said hybrid filter for upflow therethrough, and outlet means from the hybrid filter.

13. The system of claim 12, wherein the preliminary vessel is a covered anaerobic lagoon.

14. The system of claim 12, wherein the hybrid filter is a rock bed and wherein the vascular aquatic plant growing in the filter bed is reed.

15. The system of claim 12, wherein the hybrid filter is a rock bed and wherein the vascular aquatic plant growing in the filter bed is rush.

16. The system of claim 12, wherein the hybrid filter comprises a bed of rocks and has a top layer of pea gravel, to serve as a support for the vascular aquatic plants; a middle layer of rocks 2.5-7.5 cm in size and a base layer of rocks 7.5-15 cm in size.

17. The system of claim 12, wherein the hybrid filter comprises vinyl core medium as support and has as a top layer pea gravel.

* * * * *